Figure 1:
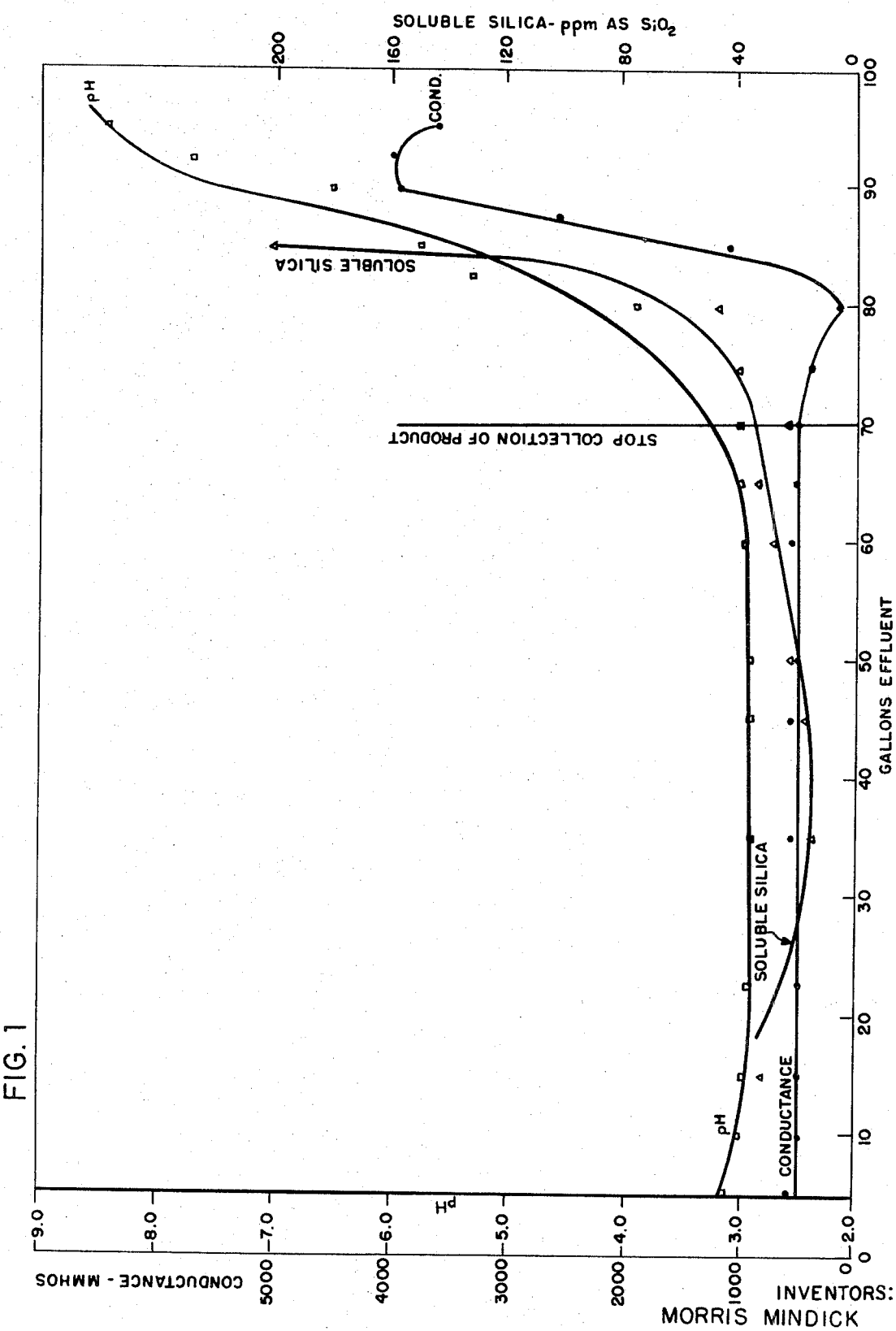

United States Patent [19]
Mindick et al.

[11] 3,867,304
[45] Feb. 18, 1975

[54] ACIDIC STABLE SALT-FREE SILICA SOLS

[75] Inventors: Morris Mindick, Tyler, Tex.; Lewis E. Reven, La Grange Park, Ill.

[73] Assignee: Nalco Chemical Company, Chicago, Ill.

[22] Filed: Feb. 28, 1972

[21] Appl. No.: 230,075

Related U.S. Application Data

[63] Continuation of Ser. No. 645,176, June 12, 1967, abandoned, which is a continuation-in-part of Ser. No. 103,425, April 17, 1961, Pat. No. 3,342,747.

[52] U.S. Cl. ........... 252/313 S, 106/286, 106/287 S
[51] Int. Cl. ....................... B01j 13/00, C01b 33/14
[58] Field of Search ................................. 252/313 S

[56] References Cited
UNITED STATES PATENTS
3,342,747  9/1967  Mindick et al. ................. 252/313 S FOREIGN PATENTS OR APPLICATIONS
521,741  2/1956  Canada ........................... 252/313 S Primary Examiner—Richard D. Lovering

[57] ABSTRACT

Silica sols are placed in contact with a strong acid cation exchange resin. The sols are then aged out of contact with the cation exchange resin for at least about 4 hours at a temperature of from about 34°F. to about the boiling point of the sols, and again contacted with a cation exchange resin. The process requires placing the sols at least twice in contact with a cation exchange resin with an aging step between each treatment, and also requires that the sols be placed at least once in contact with an anion exchange resin. The formed sols have excellent stability characteristics even at high $SiO_2$ concentrations.

2 Claims, 2 Drawing Figures

INVENTORS:
MORRIS MINDICK
LEWIS E. REVEN

ACIDIC STABLE SALT-FREE SILICA SOLS

The present invention is a continuation of copending application Ser. No. 645,176 which was filed in the U.S. Pat. Office on June 12, 1967, now abandoned, which was a continuation-in-part of copending application Ser. No. 103,425 which was filed in the U.S. Pat. Office on Apr. 17, 1961 and which is now U.S. Pat. No. 3,342,747.

The present invention relates to a process for stabilizing aqueous silica sols. More particularly, the invention is directed to a method of treating aqueous silica sols to produce products that are stable under acid conditions.

A number of methods are known by which aqueous silica sols can be formed. In most of these methods the initial step is to remove all but a small portion of the alkali metal ions which are present in water glass (sodium silicate). The product is a colloidal system of polymerized silicic acid. One of the early methods of forming aqueous silica sols consisted of neutralizing a sodium silicate solution with a mineral acid. In this process it is necessary to remove substantially all of the salts formed in the neutralization reaction. Although the salts can be removed by dialysis or electrodialysis, these procedures are not suitale for use in large scale plant operations.

The most successful process from a commercial standpoint for preparing silica sols is described in the Bird U.S. Pat. No. 2,244,325. In this process an alkali metal silicate solution is passed through an ion exchange material which removes most of the sodium ions and thereby forms silicic acid. A typical silicic acid solution produced by the Bird method contains about 3% $SiO_2$, 0.006% $Na_2O$, and about 0.003% sulfate. It has been found that the acidic sols produced by the Bird process, as well as by other methods, will gel in a few hours unless the sols are stabilized by the addition of an alkali.

One substantial disadvantage of many prior art methods of preparing silica sols is that the sols are only produced as relatively dilute solutions. In the Bird patent, for example, it is suggested that sols may be concentrated by evaporation only to a silica content of about 15%. A sol containing only 15% silica has many disadvantages. Such a product, for example, is uneconomical to ship and store because of its high water content.

More recently, a method of concentrating sols to a silica content of about 35% was disclosed by Bechtold et al in U.S. Pat. No. 2,574,902. In this process a "heel" is formed by heating alkali stabilized sols of the Bird type to a temperature above about 60°C. The heel consists of large particles or nuclei of polymerized silicic acid. When additional quantities of the dilute sol are slowly brought into contact with the heel, the added silica polymerizes on the nuclei forming much larger particles. By this means the diameter of a typical Bird sol particle is increased from about 1 to 5 millimicrons up to from 15 to 130 millimicrons.

It is believed that colloidal silicic acid contains units of silica having a plurality of functional OH groups. These functional groups are extremely reactive and tend to form linkages with each other which in time produce a three-dimensional crosslinked polymer and gel formation. If an amount of alkali metal ion is added to the sol at the time the sol is produced in the ratio of $SiO_2$ to $Na_2O$ of about 10:1 through 100:1, however, the ions will be absorbed on the surfaces of the particles causing the particles to become negatively charged. The particles then repel each other and agglomeration is prevented. Under ordinary conditions such colloidal silicic acid sols are stable for an indefinite period of time against gelation.

In U.S. Pat. No. 2,577,484, the patentee, Joseph M. Rule, suggests that aqueous silica sols that are prepared according to the method of the Bird U.S. Pat. No. 2,244,325 should also be treated with an anion exchange resin to give a sol that is substantially free of both cations and anions. Following the treatment of the dilute sol with the exchange resins, Rule forms a concentrated silica sol by the method described by Bechtold and Snyder in U.S. Pat. No. 2,574,902. In making the heel sol, a sufficient amount of a strong base is added to adjust the pH of the sol to between 6 and 9. A build-up of the sol is effected by adding fresh, unheated, salt-free active silica to the heel sol while maintaining the pH in the range from 7.5 to 10.7 and by heating the combined sols above 60°C. The products produced by the Rule method have an $SiO_2$ to $M_2O$ ratio in the range of from 130:1 to 500:1. These materials are stable against gelation so long as the pH of the sol remains between 7.5 and 10.7. The sols, however, are not stable under acid conditions.

A unique method of concentrating sols is described in Reuter et al U.S. Pat. No. 2,929,790. In this process the $SiO_2:Na_2O$ ratio is controlled so that only a sufficient number of sodium ions are present to stabilize the sol. While this method is effective in producing a sol that is stable under alkaline conditions, it is not suitable where the product is to be used under acid conditions.

As has been pointed out, aqueous silica sols preferably are stabilized by adding to the sol an inorganic base such as sodium, lithium, potassium, rubidium, caesium, or ammonium hydroxide. A sufficient amount of the base is usually added to raise the pH of the product to from 7.5 to about 11. As is indicated in the Bechtold and Snyder patent, the sols would not be stable without the addition of a strong base. If the pH is then returned to the acid side, the product becomes extremely unstable. Ordinarily, such a material will have a useful shelf life of only 5 to 6 hours. Understandably, a product of this type is not suitable for use under acid conditions.

It is widely accepted in the art that the presence of certain ions accelerate the gelling of aqueous silica sols. Methods of stabilizing sols have been proposed in which the sols are passed through both anion exchange resins and cation exchange resins.

Although the treatment of sols with ion exchange resins has proved to be helpful in preventing gelation, such methods have not been completely satisfactory. In the method described by Rule in U.S. Pat. No. 2,577,484, for example, it is necessary to maintain the pH of the sol between about 7.5 and 10.7 by the addition of a strong base. If the sols that have been treated with ion exchange resins are not stabilized by the addition of the base, it has been found that the pH of these sols tends to rise after the exchange treatment. The increase in pH causes the sols to become relatively unstable after a relatively short storage period.

The principal object of the present invention is to provide an improved process for producing sols which are stable under acid conditions.

Another object of the invention is to provide an improved method of stabilizing sols by the use of ion exchange systems.

Other objects will become apparent to those skilled in the art from the following detailed description of the invention.

In general, this invention comprises the discovery of a method for improving the stability of acidic aqueous silica sols. This method includes the steps of contacting the sol with an ion exchange system containing a hydrogen form strong acid cation exchange resin, allowing the thus treated sol to age, and subsequently again treating the aged sol with a hydrogen form strong acid cation resin. It is also essential that the sols be treated at least once with an anion exchange resin. The treatment with the anion exchange resin can take place either before the aging step, after the aging step, or both before and after the aging step. In a preferred embodiment of the invention, the pH of the sol is adjusted after the initial treatment with the ion exchange resin system.

The ion exchange resin system used in the first step of the process may be either:

A. A hydrogen form strong acid cation exchange resin.
B. A hydrogen form strong acid cation exchange resin in combination with a hydroxide form strongly basic anion exchange resin, or,
C. A hydrogen form, strong acid cation exchange resin in combination with a free base form weak base anion exchange resin.

In the first step, silica sols having an $SiO_2$ concentration ranging from between 3% to as much as 50%, and preferably 35% to 50%, are contacted with any one of the ion exchange resin systems described above. The exchange operation may be conducted either as a batch operation using a resin slurry, or in a preferred embodiment, as a column operation.

The second step of the process comprises the aging of the sols treated by the ion exchange resin system. The treated sols should age at least 1 hour at a temperature not greater than the boiling point thereof with a preferred aging step being conducted at a temperature range between 40° to 120°F. for at least 4 hours and most preferably between 16 to 24 hours.

While the aging process is most preferably conducted for the times and temperatures specified, it will be understood that the invention contemplates aging periods of up to one week or more at temperatures as low as 34°F. Also, where a rapid aging process is desirable, it is also possible to heat the sols at elevated temperatures, e.g., 120° to 180°F., thereby allowing the aging process to be completed in shortened periods of time ranging from 1 to about 4 hours.

In the third step of the process, the aged sols are again contacted with a hydrogen form strong acid cation exchange resin. As in the first deionization step, the resin system may be either A, B, or C listed above, with the proviso that the sols must be passed at least once through an anion exchange resin. The second deionization step may be accomplished using either a slurry or column technique. If the sols are to be treated with both an anion and cation resin after the aging step, they may be contacted in any sequence, although the preferred sequence is to treat the sols initially with a cation exchange resin and then with the anion exchange resin. A further deionization technique involves the use of a mixed bed system which contains an intimate admixture of hydrogen form strong acid cation exchange resin and an anion exchange resin.

It is preferred that the anion exchange resin be a strong base resin which is capable of salt-splitting reactions and which also will remove weak acids such as carbonic acid lower molecular weight silicic acids from the sols. It is also within the scope of the invention, however, to use a weak base anion exchange resin.

The anion and cation exchange resins can be used in series or in mixed bed. The strong acid cation exchange resins remove cations (predominantly Na). Strong base anion exchange resins remove all anion impurities including weak anions.

There are several strong acid resins that are commercially available which can be used successfully in the subject process. One such product is sold under the trademarks Nalcite HCR and Dowex 50. This product is described in U.S. Pat. No. 2,366,007. The resin is made by the nuclear sulfonation of styrene-divinyl benzene beads. Similarly, there are many strong base resins which can be used in the process. Examples of these materials include the commercially available Nalcite SBR, Dowex 1, Dowex 2, Dowex 11, and Dowex 21K. Nalcite SBR and Dowex 1 and 2 are described in U.S. Pat. No. 2,591,573. Each of the above exchange resins has a quaternary ammonium type of exchange group. The quaternary ammonium anion exchange resins are highly ionized and can be used over the entire pH range. They are capable of salt-splitting reactions which convert a neutral salt to its corresponding base. A typical weak base anion exchange resin that can be used in the process is "Amberlite IR-4B" which is a modified phenolformaldehyde polyamine condensate containing 14% nitrogen and 39.9% water in the basic form of the resin and having an exchange capacity of 10 milli-equivalents per gram of resin. The properties of the resin are described by Kunin and Meyers in the Journal of the American Chemical Society, Volume 69, p. 2874, for 1947. Other anion exchangers are described in U.S. Pat. No. 2,422,054 and 2,438,230.

The sols produced by treatment with the ion exchange resin system in the first process step are acidic to varying degrees depending upon the particular resin system employed. It has been observed that both the pH and viscosity of these sols will tend to increase in storage.

It is desirable that the aging process be conducted using sols which do not fluctuate in pH and which do not increase in viscosity. The aging process is most beneficially conducted upon sols having a pH within the range of from 1.5 to not more than 3.5 with a preferred pH ranging between 2.5 and 3.

When the hydrogen form strong acid cation exchange resin is used as the ion exchange resin system, the treated sol will have a pH of 2 or less. This low pH sol is admirably suited for the subsequent process steps of the invention. When the ion exchange resin system comprises a combination of a hydrogen form strong acid cation exchange resin in conjunction with either a hydroxide form strong or free base form weak base anion exchange resin, the pH of the resultant treated sol will range between 3 to about 5, depending upon the particular resin system employed and the degree of regeneration of the cation exchange resin.

Specifically, when an incompletely regenerated hydrogen form strong acid cation exchange resin is used in combination with a hydroxide form strong base anion exchange resin to treat the silica sols, the resultant pH will be approximately 5. Upon standing at room temperature, e.g., 72° ± 5°F., for one week, the pH of the treated sol will gradually approach 6. With increasing pH there will also be noted an increase in viscosity.

When a completely regenerated hydrogen form strong acid cation exchange resin is used in conjunction with a hydroxide form strong base anion exchange resin, the sols treated with such a system will have a finished pH of about 3, which, upon storage for one week at room temperature, will tend to increase to about 5.

The completely regenerated strong acid cation exchange resin referred to above is one which may be prepared by using, for example, 25 pounds of sulfuric acid per cubic foot at a regeneration flow rate of between 2 and 25 gallons per minute per square foot of resin area. While the completely regenerated resin yields a sol having the most desirable finished pH, the regeneration necessary to produce such a resin is not always commercially expedient.

An incompletely regenerated strong cation exchange resin is one produced using more conventional regenerative procedures, e.g., 10 pounds of sulfuric acid per cubic foot at the flow rate corresponding to those used in producing a completely regenerated resin.

An incompletely regenerated cation resin, when used in combination with a hydroxide form strong base anion exchange resin in a mixed bed unit is capable of producing a low pH sol, e.g., pH 3 which upon storage will increase in pH.

When a hydrogen form strong acid cation exchange resin is used in combination with a free base form weak base anion exchange resin, the finished sol treated with this system will have a pH ranging between 3 and 4. The use of the weak base resin represents the least preferred ion exchange resin system, inasmuch as it does not remove acids completely.

When using both strong acid cation and strong base anion exchange resins, care should be taken to have sufficient regeneration of the cation exchanger in order to prevent too high a pH in the final effluent. At pH values above 6, and especially above 7, the viscosity increase which develops in the strong base resin column will necessitate the use of high pumping pressures.

Of the three ion exchange resin systems discussed above, a hydrogen form strong acid cation exchange resin in combination with a hydroxide form strong base anion exchange resin is most desirable. This combination system is beneficial in removing weakly acidic materials such as carbonic and silicic acids, thereby adding to the stability and purity of the finished product.

Regardless of the starting ion exchange resin system used, the pH of the treated sols tends to increase. This increase in pH may be hypothesized as resulting from alkali metal ions which were initially occluded within the silica particles. Under acid conditions these alkali metal ions are removed from their associated state with the silica particles, and translocate into the aqueous phase of the sols. This migration of the alkali metal into the aqueous phase of the sol occurs during the aging step. The translocation of the alkali metal into the aqueous phase of the sols is further promoted by maintaining the sols under buffered acidic pH conditions. For this reason the pH of the sols during the aging process are desirably maintained at a pH between 1.5 and 3.5, and preferably between 2.5 and 3 by adding to the sols after treatment with the starting ion exchange resin system a water soluble low molecular weight acidic material, such as hydrochloric acid, acetic acid, sulfuric acid, phosphoric acid, and the like.

When using both cation and anion resins, addition of minor amounts of acid between the deionization steps can be accomplished by any one of several methods. In one such method the sol, after passage through the cation resin, is passed through an anion resin bed which leaks acid such as a weak base resin. By this means it is possible to incorporate the acid in the sol without requiring a separate step. Another method is to bypass a portion of the cation bed effluent into the anion resin effluent. In the more usual process, the acid is added to the aging tank after all the sol has passed through both columns.

The aging step, either alone or in conjunction with acidification of the ion exchange resin system treated sols, in promoting the migration of cations into the aqueous phase of the sols, allows the final deionization step of the invention to remove completely all vestiges of ionic components present thereby producing an ion free acidic sol of high purity and stability. When the aging process is conducted as indicated there is no change in the physical form of the silica particles nor is there any increase in the viscosity of the final sol. The finished product is an aqueous liquid having colloidally dispersed therein substantially discrete, dense, nonagglomerated particles of silica. These pure salt-free sols have a pH ranging between 2.6–3.8 and preferably between 2.9 and 3.5, which pH is derived from the acidic surface sites of the colloidal silica particles. These stable sols show little or no change in pH under conditions of long-term storage, as evidenced by elevated storage tests conducted at 120°F. for one month and for 20 weeks.

The finished sols may be further characterized as having a specific conductivity less than 1,000 micromhos/cm. at 77°F. which is derived primarily from the dissociation of the silanol groups on the surfaces of the silica particles.

The sols produced by the practices of the invention have the same silica content, e.g. 3 to 50%, and preferably 35% to 50%, as the starting sols and have specific surface areas ranging between 50–800 m$^2$/g.

FIG. 1 depicts graphically vs. the number of gallons of effluent, the measurements of pH, conductance, and soluble silica content of silica sol product which is produced by deionazation using a strong base anion exchange resin in the OH form and a strong acid cation exchange resin in the H$^+$ form.

Figure 2:
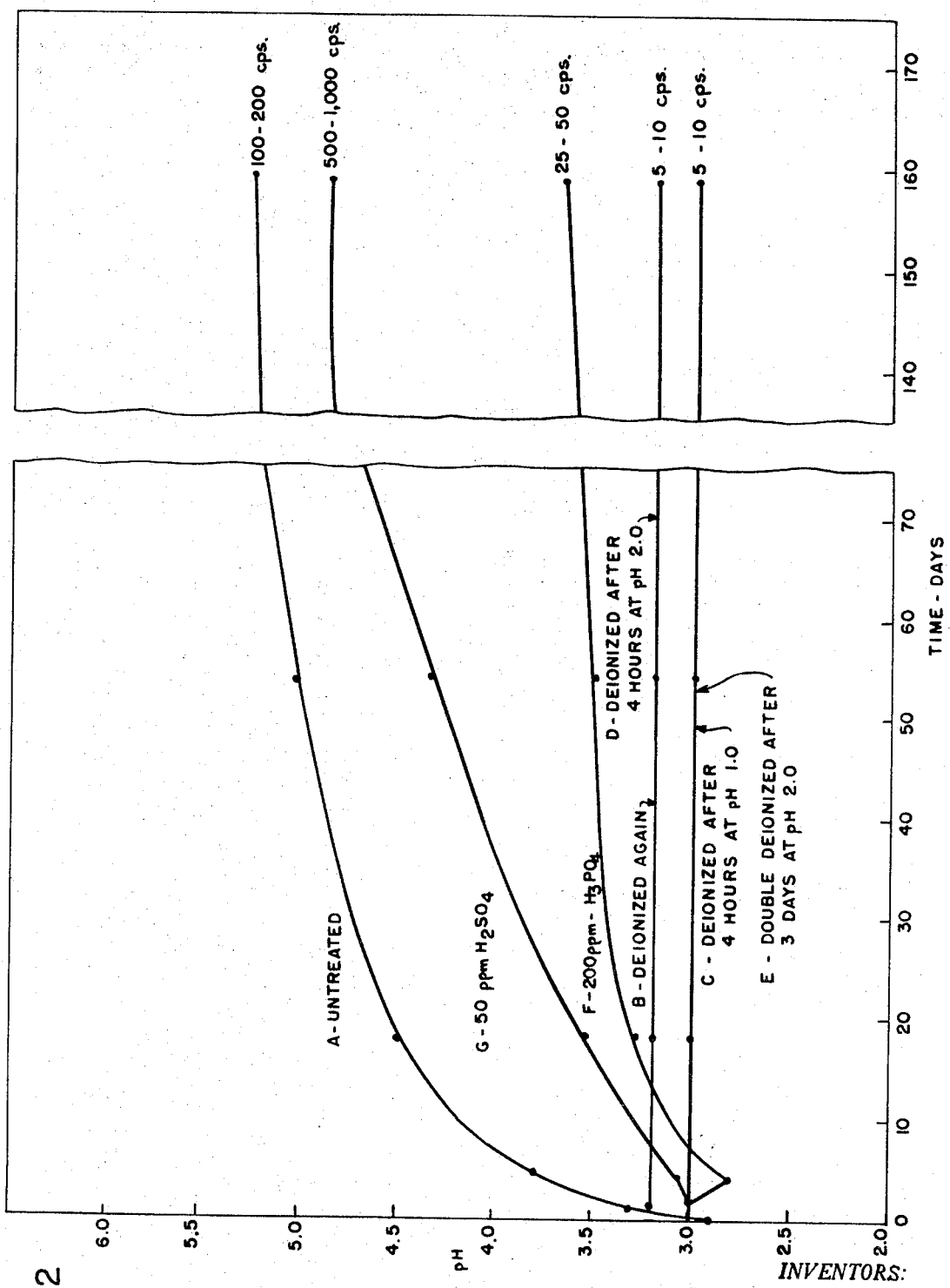

FIG. 2 depicts graphically vs. the time in days, the pH of various silica sol products which have been (a) deionized in the manner of the silica sol product of FIG. 1, (b) deionized again, (c) adjusted to pH 1.0 with HCl and deionized after 4 hours, (d) adjusted to pH 2.0 with HCl and deionized after 4 hours, (e) adjusted to pH 2.0 with HCl and deionized after 3 days, (f) adjusted to pH 3.0 with H$_3$PO$_4$, and (g) adjusted to pH 3.0 with H$_2$SO$_4$.

The following examples will serve to illustrate the invention. The conductance measurements, abbreviated to mmhos, is the specific conductance in micromhos/cm. at 77°F.

EXAMPLE I

A two-drum (110 gallons) quantity of a commercially available 35% silica sol was deionized by passing the sol through a six inch diameter column containing 25 inches of a strong base anion exchange resin at the bottom of the column and 25 inches of a strong acid cation exchange resin at the top of the column. The strong base anion exchange resin was a commercially available product known as Nalcite SBR which is described in U.S. Pat. No. 2,591,573. The strong acid cation exchange resin was the commercially available product Nalcite HCR which is described in U.S. Pat. No. 2,366,007. The deionization of the sol was carried out at a flow rate of 0.75 gpm (gallons per minute) which is equivalent to 5 gpm/ft². A composite of the effluent from the column produced a product having a pH of 2.1 and a conductance of 650 mmhos. The low pH indicated that some acid leakage had occurred through the anion bed. After standing overnight, the material again was passed through the ion exchange unit. The composite of this material gave a pH of 3.10 and a conductance of 395 mmhos. This product is believed to be almost permanently stable.

EXAMPLE II

In this experiment, a 70 gallon quantity of a commercially available 35% silica sol was deionized by passing the material through a six inch diameter column containing 0.324 ft³ Nalcite SBR—OH⁻ on the bottom and 0.337 ft³ Nalcite HCR—H⁺ on the top at a flow rate of 0.5 gpm which is 3 gpm/ft². At frequent intervals during the preparation of this batch the pH, conductance, and soluble silica content of the product were measured. These measurements are set forth graphically in FIG. 1 of the drawing.

The average pH and conductance of the sol produced in this experiment were 2.9 and 500 mmhos, respectively. After standing overnight the pH of the sol rose to 3.5 and the conductance dropped to 185 mmhos. After 11 days the pH increased to 5.15. After 23 days the pH of the sol was 5.32 and the viscosity was 11.96 cps. After one month the viscosity had reached 20.8 cps and shortly thereafter the material gelled.

EXAMPLE III

In this test, 43 gallons of a commercially available 35% silica sol was passed through a column containing the resins described in connection with Example I and II. The flow rate of the sol was varied from 1.5 gpm/ft² to 6.2 gpm/ft². The pH and conductance of the product were not influenced by the variation in flow rate and were constant at 2.8 and 300, respectively. After one day, the pH of the sol rose to 3.30 and the conductance dropped to 110 mmhos. Portions of this sol (one day old and at pH 3.3) were treated in the following ways:

A. Untreated
B. Deionized again
C. Sample adjusted to pH 1.0 with 16,000 ppm HCl and deionized after 4 hours.
D. Sample adjusted to pH 2.0 with 1,600 ppm HCl and deionized after 4 hours.
E. Sample adjusted to pH 2.0 with 1,600 ppm HCl and deionized after 3 days.
F. Sample adjusted to pH 3.0 with 200 ppm $H_3PO_4$.
G. Sample adjusted to pH 3.0 with 50 ppm $H_2SO_4$.

FIG. 2 of the drawing shows the effect of the above treatments on the pH of the sol. As can be seen from the drawing, double deionization even without the addition of acid stabilizes the product at the desired pH. The addition of acid (50 ppm $H_2SO_4$ and 200 ppm $H_3PO_4$) is ineffective in preventing an increase in the viscosity of the sol.

One of the accepted theories of colloidal chemistry is that the gelation of silica sols is caused by the condensation of silanol groups on the surface of the particles which forms siloxane linkages. The fewer collisions between the individual particles, the less likely is it that the silanol groups of different particles will react to form siloxane bonds. The particles tend to remain apart because of the negative charge on their surface. It is known that OH ions in the solution catalyze the condensation of silanol groups. It is also known that neutral salts which are present in the solution reduce the repulsive force exerted by the charged particles. One of the distinct advantages of the present invention is that substantial amounts of neutral salts are not formed during the stabilization step.

As was pointed out above, it is likely that the increase in pH of the deionized sol is due to the presence of occluded sodium ions. Viscosity studies have shown that there is an occluded volume of about 5% in the sol particle. By allowing the product to stand for at least four hours and preferably for at least 14 hours the bulk of the sodium ions diffuse out into the liquid where the second deionization will remove them. It has been found that this double ion exchange treatment produces a product containing insufficient residual sodium to increase the pH of the sol above about 3.2.

It would, of course, be possible to pass the sol more than twice through the deionization bed. Such a procedure, however, would be impractical from a commercial standpoint and would not increase the stability of the sol to any substantial extent.

Under certain conditions, it has been found to be desirable to add minor amounts of an acidic material after the second deionization step. These acidic materials may be selected from low molecular weight acids such as hyrochloric, sulfuric, acetic and phosphoric with the latter two being the preferred members of this class. The amount added usually will not be more than 50 parts per million, and preferably 10–30 parts per million. These acids tend to neutralize any metallic corrosion products or traces of alkalinity leached from drum or tank coatings during the storage and transportation of the sols.

The following table sets forth sols which exemplify the materials which can be treated by the subject process.

|  | NALCOAG 1015 | NALCOAG 1030 | NALCOAG 1035 | NALCOAG 1050 |
|---|---|---|---|---|
| % Colloidal Silica as $SiO_2$ | 15 | 30 | 35–36 | 49–50 |
| pH | 8.6 | 10.2 | 8.6 | 9.0 |
| Viscosity as 77°F. cps | Less than 5 | Less than 5 | Less than 5 | Less than 30 |
| Specific gravity at 68°F. | 1.09 | 1.205 | 1.255 | 1.385 |
| Average surface area M²/gram of $SiO_2$ | 330–430 | 190–270 | 135–190 | 120–150 |
| Average particle size millimicrons | 7–9 | 11–16 | 16–22 | 20–25 |
| Density No./gallon at 68°F. | 9.1 | 10.0 | 10.5 | 11.6 |
| Freezing point | 32°F. | 32°F. | 32°F. | 32°F. |
| $Na_2O$ percent | 0.04 | 0.40 | 0.10 | 0.3 |

The holding period between the deionization steps can range from 1 hour up to as long as one week or more. Our preferred holding period is from 14 to about 48 hours, and our most preferred holding period is from 16 to 24 hours.

Obviously many modifications and variations of the invention as hereinbefore set forth may be made without departing from the spirit and scope thereof, and therefore only such limitations should be imposed as are indicated in the appended claims.

We claim:

1. An acidic stable salt-free silica sol consisting essentially of an aqueous liquid having colloidally dispersed therein from 3% to 50% by weight of substantially discrete, dense, nonagglomerated particles of silica, which particles have a specific surface area of from 50–800 m²/g, said silica sol having a pH ranging between 2.6 to 3.8 and a specific conductivity not greater than 1,000 micromhos/cm. at 77°F., with the pH and conductivity being derived primarily from the dissociation of the acidic groups on the surfaces of the silica particles, said sol being further characterized by its substantial freedom from occluded sodium ions, said sol being formed by placing a sol containing from about 3% to about 50% $SiO_2$ in ion exchange relationship with a strong acid cation exchange resin in the hydrogen form; removing said sol from contact with said cation exchange resin; aging said sol out of contact with said cation exchange resin for a period of at least about 4 hours at a temperature of from about 34°F. to about the boiling point of said sol; and again placing the said sol in ion exchange relationship with a strong acid cation exchange resin in the hydrogen form, said sol also having been placed at least once in ion exchange relationship with an anion exchange resin.

2. A silica sol as in claim 1 containing from 35% to 50% by weight of said silica particles.

* * * * *

UNITED STATES PATENT AND TRADEMARK OFFICE
CERTIFICATE OF CORRECTION

PATENT NO. : 3,867,304
DATED : February 18, 1975
INVENTOR(S) : MORRIS MINDICK and Lewis E. Reven It is certified that error appears in the above-identified patent and that said Letters Patent are hereby corrected as shown below:

Column 4, line 4, "carbonic acid lower" should read --carbonic and lower--.

Column 6, line 48, "OH" should read --$OH^-$--.

Signed and Sealed this

Thirtieth Day of November 1976

[SEAL]

Attest:

RUTH C. MASON
Attesting Officer

C. MARSHALL DANN
Commissioner of Patents and Trademarks